Nov. 1, 1960   L. E. W. MONTROSE-OSTER   2,958,305
SHIP STABILIZING EQUIPMENT
Filed Aug. 2, 1954   2 Sheets-Sheet 1
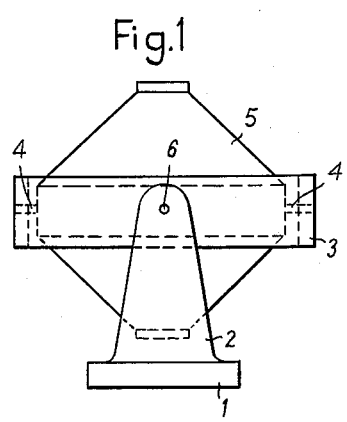
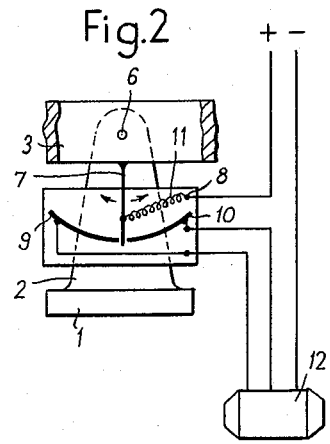
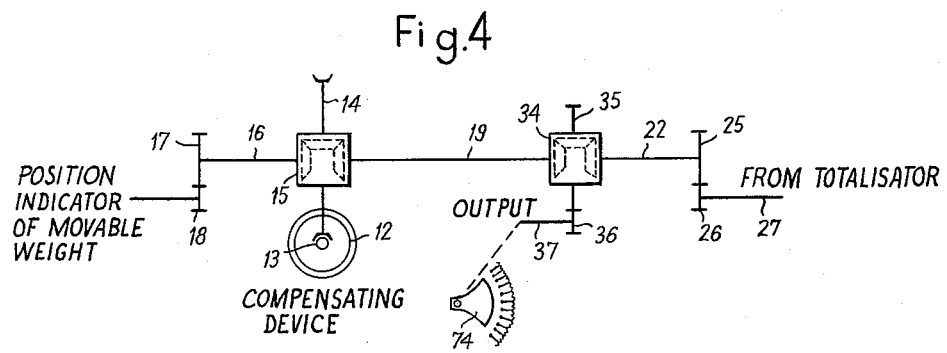
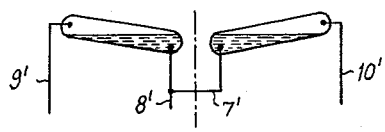
Inventor
Louis Eugene Witolt Montrose-Oster
By
Attorneys

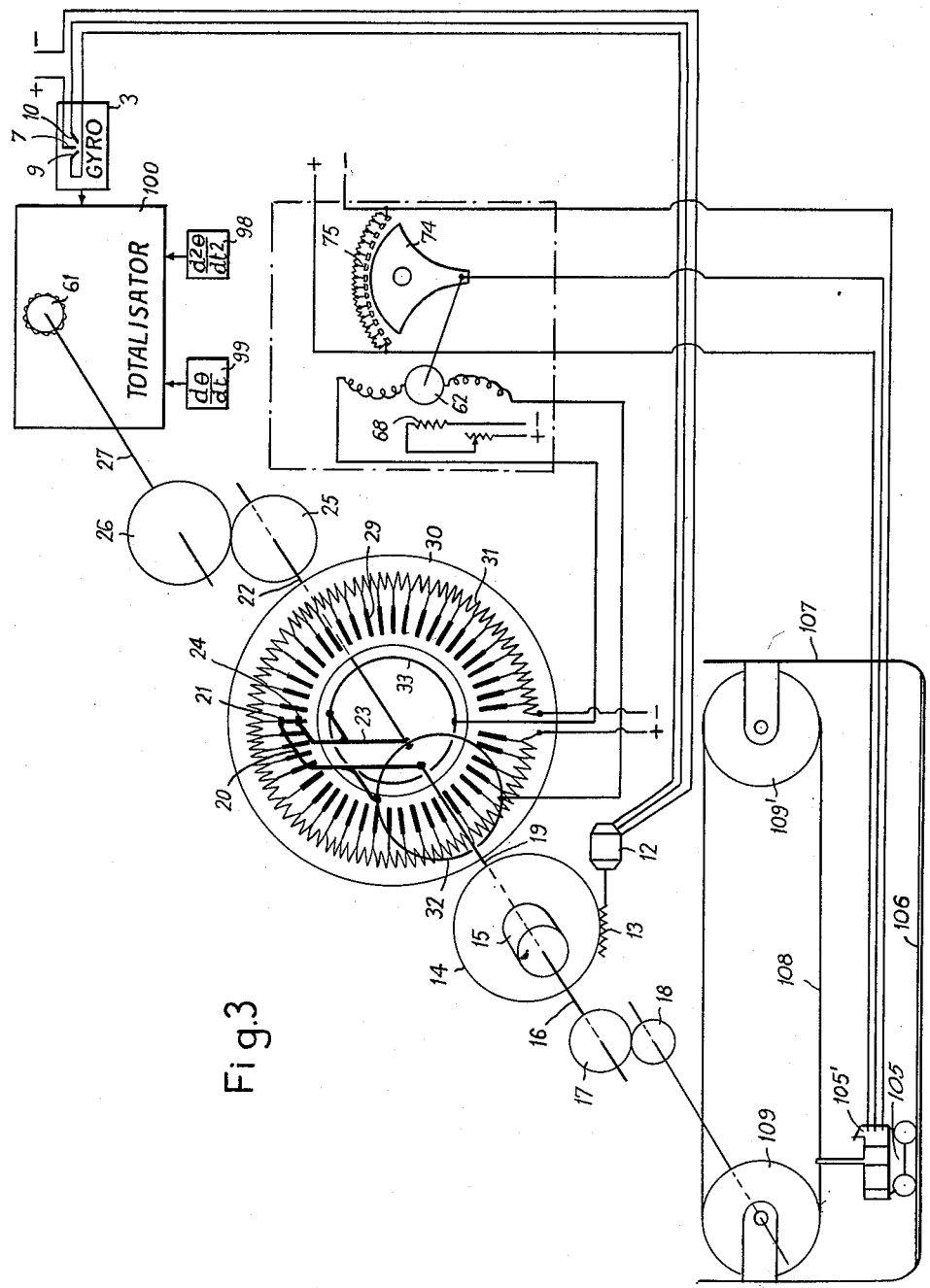

United States Patent Office 2,958,305
Patented Nov. 1, 1960

2,958,305
SHIP STABILIZING EQUIPMENT

Louis Eugene Widolt Montrose-Oster, Brussels-Boitsfort, Belgium, assignor to Pollopas Patents Limited, London, England, a British company Filed Aug. 2, 1954, Ser. No. 447,032

5 Claims. (Cl. 114—124)

Various systems for the automatic regulation and control of ship stabilizers have been proposed. These systems, which generally detect, by means of one or more gyroscopes, the angle of rolling and/or one or more of its derivatives, are suitable, in principle for controlling any kind of stabilizing equipment. Their purpose is two-fold, namely rapidly to damp out all rolling movement and also to restore and maintain the ship in a position corresponding to the vertical. But this latter object can only be attained under a condition when no other influence, except that of the sea, acts on the vessel. Under the influence of a lateral wind or of an assymmetrically distributed cargo the ship will have a tendency to oscillate about a plane which extends at a certain angle with the vertical, and to maintain this angle when the rolling ceases.

Such a static list may be considered acceptable. However, it produces a quite serious disadvantage. The stabilizing equipment remains permanently in a partially active condition which produces serious expenditure of energy with most types of stabilizing equipments (vanes and pumps).

However, in the case of a stabilizer which operates by the displacement of a weight, either liquid or solid, it is possible not only to restore the ship to the vertical but also to maintain it there without continuous expenditure of energy. Hitherto known regulating and control systems, however, do not take account of this possibility.

The present invention provides an apparatus which, combined with the existing regulating and control apparatus of a ship stabilizing equipment in which the stabilizer comprises a moving weight, compensates in a simple and automatic fashion and without expenditure of energy, for any static list of a ship with respect to the vertical (true or apparent). The apparent vertical is the direction of the resultant of gravity and a component of acceleration in a direction which is not parallel to the true vertical.

The accompanying drawings show, by way of non-limiting example, the details of some embodiments for carrying the invention into effect. In the drawings:

Fig. 1 is a view of a vertical axis gyroscope looking in the direction of travel of the ship.

Fig. 2 is a detail view of the front support of this gyroscope and its suspension ring, the gyro itself being omitted.

Fig. 3 is a schematic perspective view of the invention as applied to stabilizing equipment incorporating a follow-up system of the electric type, and Fig. 4 is a schematic view of an embodiment of the invention applied to stabilizing equipment incorporating a mechanical type of follow-up system.

Fig. 5 is a view of a modification employing a mercury switch.

In Figs. 1 and 2, 1 indicates the base and 2 the supports of a gyroscope ring 3 which is pivoted to the supports at 6; 4 is the axis of the cage 5 containing a gyroscope rotor with a vertical axis. This gyroscope may form part of the normal control mechanism for the stabilizer.

Fixed to the ring 3 is a contact finger 7 connected to a terminal 8 by means of a flexible and extensible wire 11. The finger 7 contacts either with the contact segment 9 or with the contact segment 10 as soon as the ring 3, executing an angular movement about its axis 6, leaves its neutral position parallel to the base 1.

The elements 7, 9, 10 constitute a commutator switch controlling the two directions of movement of an electric servo-motor 12 which, by means of a worm 13 (preferably of the irreversible type), drives a toothed wheel 14 fixed to the cage 15 of a mechanical differential gear of normal construction.

The pinion 17 mounted on the free shaft 16 of the differential gear executes an angular movement as a function of the displacement of the moving weight of a stabilizing equipment which is diagrammatically illustrated as a truck 105 running on rails 106 near the bottom of the hull 107 of the ship in the manner described in the specification of my Patent No. 2,695,586, dated November 30, 1954. The truck 105 is adapted to be actuated by a motor 105′, and is connected to move an endless cable 108 passing over pulleys 109, 109′ journaled adjacent opposite sides of the ship, whereby displacement of the truck 105 will be transmitted via the cable 108, pulley 109 and the pinion 18 to the pinion 17.

The other free shaft 19 of the differential gear terminates in an arm 20 furnished with a wipe contact 21.

Coaxial with this shaft 19 is arranged a shaft 22 which, at its inner end is provided with an arm 23 furnished with a wipe contact 24 and, at its outer end, is provided with a pinion 25. A pinion 26 meshing with the pinion 25 and mounted on the shaft 27, is operated by a known totalisator 100 which totalises the resultant of the various devices which detect the influencing factors which have to be taken into account in controlling the operation of the stabilizing equipment; these may comprise for example (1) the gyro 3 detecting the angle of rolling $\theta$ (2) the detector 99 of the angular speed of rolling $$\frac{d\theta}{dt}$$

and (3) the detector 98 of the angular acceleration of rolling $$\frac{d2\theta}{dt2}$$

One form of such totalisator is described in the specification of my Patent No. 2,695,585, issued November 30, 1954 (see Figure 4 thereof), of which the resultant of factors (1) and (3) above mentioned is indicated by the position of the pinion 61 shown in that figure, which pinion is indicated by the same reference number within the block 100 in Figure 3 of the accompanying drawings. The pinion 61 drives the shaft 27 in accordance with the resultant of the totalisator. One form of the detector 98 is described in U.S. Patent No. 2,530,717, issued November 21, 1950. If it be desired also to totalise factor (2), this may be detected mechanically in known manner, for example as described in British Patent No. 604,598, and used to influence the pinion 61.

When the shafts 19 and/or 22 execute angular movements, the two wipe contacts 21 and 24 are displaced over a circular track 29 of contact elements mounted on a fixed insulating plate 30. The different contact elements of this contact track are connected, for example, to tapping points on a potentiometer 31 fed with direct current.

The arm 20 is in permanent contact with the slip ring 32 and the arm 23 with the slip ring 33, both slip rings being fixed on the plate 30. According to the relative positions of the arms 20 and 23 an electromotive force can exist between the rings 32 and 33, which are connected in series with a regulator 62 comprising a moving coil member influenced by an exciter winding 68 fed from a source of direct current. The regulator 62 actuates a sector 74 which is arranged to roll on a bank of contacts 75 which are connected to actuate the stabilizer 105, for example as described in the aforesaid specifications Nos. 2,695,585 and 2,695,586. The regulator 62 thus executes movements in one direction or the other proportional to the value and polarity of the electromotive force traversing its winding. In rolling on the bank of contacts 75, the sector 74 controls the operation of the stabilizer 105 to exert a stabilizing couple in one direction or the other.

The apparatus described comprising the elements 16 to 27 and 29 to 33, constitutes a substantially conventional electric follow-up system for controlling the operation of the stabilizer 105 in response to the operation of the totalisator 100. The elements 7, 9, 10, 12, 13, 14 and 15 represent additional apparatus according to the invention which enable the ship to be stabilized in the true vertical, notwithstanding a contingent static list, as will be hereinafter explained.

In the resting position (Fig. 3) there is no electromotive force between the rings 32 and 33.

If the totalisator 100 causes the pinion 26 to turn in the anticlockwise direction, the pinion 25, shaft 22, arm 23 and wipe contact 24 will all turn in the clockwise direction. This produces an electromotive force between 24 and 21 which moves the regulator 62 and sector 74 and consequently the stabilizer is caused to move and turns the pinion 18 in the clockwise direction, which causes the pinion 17 and the shaft 16 to turn in an anticlockwise direction. The cage 15 of the differential gear being stationary, there is thus produced an angular movement in the clockwise direction of the shaft 19 and the arm 20 with its wipe contact 21, which tends to restore the wipe contact 21 to the position of the wipe contact 24. The stabilizer stops moving as soon as this restoration is complete.

In addition to influencing the totalisator 100 as described in the aforesaid specification No. 2,695,585, an angular movement of the gyroscope also causes the servo-motor 12 to come into action as soon as, and to act as long as, the finger 7 engages with one of the segments 9 or 10.

Assuming that Figs. 1–3 show the apparatus looking in the direction of movement of the ship, when the ship rolls towards the starboard side, in addition to the inclination of the ship causing the totalisator 100 and consequently the stabilizer 105 to act in the manner just described, it also causes the finger 7 to come into contact with the segment 10 which causes the servo-motor 12 to start. Through the worm 13, the toothed wheel 14 and the cage 15 of the differential gear are caused to execute an angular movement in the anticlockwise direction, thus increasing still more the spacing between the wipe contacts 21 and 24. The motor 12 will continue to turn as long as the ship is more or less inclined to starboard. It will stop when the ship passes through the neutral position and will start to move in the opposite direction as soon as there is a list to port.

It will be seen that, for a regular roll, the resultant of the action of the motor 12 will be zero since compensation will have taken place. But if for some reason or another, the roll is more pronounced for example to starboard than to port, the motor 12 will displace the wipe contact 21 more in the anticlockwise direction than it returns it in the clockwise direction. Consequently there is more and more pronounced displacement of the movable weight to port until the residual rolling will have again become symmetrical or the ship will have been stabilized in the true vertical. The movable weight will oscillate about a neutral vertical plane situated on the port side of the mean vertical plane of the ship.

When the cause of the static list has disappeared, the neutral vertical plane will again move towards the mean vertical plane to bring the two planes into coincidence. The arrangement according to the invention reacts in a corresponding manner in the case of a static list to port.

Fig. 4 shows schematically an embodiment of the invention employing mechanical follow-up system. All similar elements are marked with the same reference numbers as in Fig. 3. The contact track 29, the potentiometer 31, the arms and wipe contacts 20, 21, and 23, 24 are replaced by a differential gear of which the cage 34 is provided with a toothed wheel 35 meshing with a pinion 36. The shaft 37 of this latter drives the sector 74 to control the action of the stabilizer 105 in the manner above described. As in the case of Fig. 3 the elements 7, 9, 10, 12, 13, 14, 15 represent the additional apparatus according to the invention which makes it possible to stabilize the ship in the true vertical, notwithstanding a contingent static list, whatever be its cause.

In a similar fashion, in the case of a regulator which stabilizes to the apparent vertical, the additional equipment according to the invention will permit stabilization to the apparent vertical by compensating for any contingent static list, whatever be its cause. An arrangement equivalent to 7, 8, 9 and 10 will be controlled by the apparent vertical indicator.

A mercury commutator switch as shown in Fig. 5, fixed approximately at the C.G. of the ship and arranged transversely thereto, is a known form of apparent vertical detector, since although its neutral state will indicate the true vertical in calm, or almost calm water; that is to say when the horizontal component of acceleration is zero or nearly zero, its neutral state will automatically indicate the apparent vertical as soon as this latter no longer coincides with the true vertical. In fact, by its very nature, such a mercury commutator switch is not only subject to the influence of gravity but also, and automatically, to the influence of the horizontal component of acceleration such as is due to a centrifugal force.

The speed of the servo-motor 12 should be chosen such that its action will be relatively slow. The neutral vertical plane of the movable weight will thus only be displaced gradually; it will require several oscillations of the ship in order to move it into an eccentric position resulting from a static list.

The speed of the servo-motor 12 may, depending upon the circumstances, be constant or even increase as a function either of the angle of rolling or of its running time, for example by replacing the single contact segments 9 and 10 by resistances or by segments with multiple contacts connected to resistances, or in the case of a mercury switch, by replacing in known manner the single contacts 9', 10' by systems of contacts which successively come into contact with the mercury. In this manner it is possible, for example, to influence the regulation as a function of the integral of the angle.

Although Fig. 5 shows two mercury tubes, separate from each other, which enables any desired value to be given to the inactive zone, a single bent tube could as well be used, as well as any other equivalent arrangement.

While particular embodiments have been described, it will be understood that various modifications may be made without departing from the scope of the invention. For example the gyroscope contacts can alternatively be of the cam type or of the mercury type, instead of comprising a finger movable over two segments. Further, other constructions are possible for combining the auxiliary apparatus with the stabilizer control apparatus. Moreover, the apparatus can also be used in association with equipment for stabilizing only part of a ship, for example a gun turret, or for stabilizing other floating vessels, such as floating "islands."

I claim:

1. Ship stabilizing equipment comprising a movable mass, a motor for actuating said mass transversely of the ship to produce a stabilizing couple, detector means for detecting the roll of the ship and producing an output corresponding thereto, a regulator controlling the operation of the motor to actuate the movable mass about a neutral position, control means actuating said regulator in accordance with the said output, means producing a signal when and for so long as the ship inclines transversely to the vertical, and a servo-motor operated by said signal and influencing the control means to effect an increased movement of the mass towards one side of the ship for so long as said signal indicates an inclination of the ship towards the other side of the ship, thereby effecting a displacement of said neutral position to compensate automatically and progressively for a static list of the ship.

2. Ship stabilizing equipment comprising a stabilizer constituted by a movable mass, a motor for actuating said mass transversely of the ship to produce a stabilizing couple, detector means for detecting the roll angle of the ship and its derivatives, a totalisator producing an output porportional to the resultant of said detector means, a regulator controlling the operation of the motor to actuate the movable mass about a neutral position, control means for actuating said regulator, said control means including a follow-up arrangement, a driving connection to one side of said follow-up arrangement actuated by the output from said totalisator, a second driving connection to the other side of said follow-up arrangement actuated by the movement of the mass, a differential gear having three elements, two of said elements being connected in one of said driving connections, means producing a signal when and for so long as the ship inclines transversely to the vertical, and a servo-motor operated by said signal and connected to drive the third element of the differential, whereby to effect an increased movement of the mass towards one side of the ship for so long as said signal indicates an inclination of the ship towards the other side of the ship, thereby effecting a displacement of said neutral position to compensate automatically and progressively for a static list of the ship.

3. Equipment as claimed in claim 2, wherein said servo-motor comprises a reversible electric motor and said further means comprises a commutator switch having a central inoperative position, the switch being connected in two electric circuits connected to the reversible electric servo-motor which is connected to drive the third element of the differential gear, said circuits alternatively being completed in accordance with the direction of inclination of the ship and causing the electric servo-motor to revolve in one direction or the other in response to the particular circuit which has been completed.

4. Equipment as claimed in claim 3, wherein the commutator switch comprises at least one tube fixed to the ship and partially filled with mercury, said tube having two contacts which lie above the level of the mercury when the ship is vertical and alternatively contact the mercury depending upon the direction of inclination of the ship.

5. Ship stabilizing equipment comprising a stabilizer constituted by a movable mass, a motor for actuating said mass transversely of the ship to produce a stabilizing couple, detector means for detecting the roll angle of the ship and its derivatives, a totalisator producing an output proportional to the resultant of said detector means, a regulator controlling the operation of the motor to actuate the movable mass about a neutral position, control means for actuating said regulator, said control means including a follow-up arrangement, a driving connection to one side of said follow-up arrangement actuated by the output from said totalisator, a second driving connection to the other side of said follow-up arrangement actuated by the movement of the mass, a phase-variable coupling having input and output members connected in one of said driving connections and having adjusting means to alter the phase relationship between said input and output members, means producing a signal when and for so long as the ship inclines to the vertical, and a servo-motor operated by said signal and connected to actuate said adjusting means.

References Cited in the file of this patent

UNITED STATES PATENTS

| 1,853,069 | Minorsky | Apr. 12, 1932 |
| 2,017,072 | Minorsky | Oct. 15, 1935 |
| 2,130,929 | Rocard | Sept. 20, 1938 |
| 2,202,162 | Minorsky | May 28, 1940 |
| 2,588,213 | Davis et al. | Mar. 4, 1952 |
| 2,695,585 | Montrose-Oster | Nov. 30, 1954 |
| 2,695,586 | Montrose-Oster | Nov. 30, 1954 |

FOREIGN PATENTS

| 704,992 | Germany | Apr. 15, 1941 |